United States Patent [19]

Nayar et al.

[11] Patent Number: 5,509,598
[45] Date of Patent: Apr. 23, 1996

[54] WAVE SOLDERING APPARATUS AND PROCESS

[75] Inventors: Harbhajan Nayar, Murray Hill, N.J.; Sean M. Adams, Bethlehem, Pa.; Neeraj Saxena, New Providence; Bohdan A. Wasiczko, High Bridge, both of N.J.

[73] Assignee: The BOC Group, Inc., Murray Hill, N.J.

[21] Appl. No.: 251,055

[22] Filed: May 31, 1994

[51] Int. Cl.[6] ................................................ H05K 3/34
[52] U.S. Cl. .................... 228/180.1; 228/37; 228/219; 228/260
[58] Field of Search .......................... 228/37, 180.1, 228/219, 260

[56] References Cited

U.S. PATENT DOCUMENTS

| | | | |
|---|---|---|---|
| 4,375,271 | 3/1983 | Tsuchikura | 228/180.1 |
| 4,433,805 | 2/1984 | Kanno | 228/180.1 |
| 5,203,489 | 4/1993 | Gileta et al. | 228/219 |
| 5,297,724 | 3/1994 | Mehta et al. | 228/219 |
| 5,409,159 | 4/1995 | Connors et al. | 228/219 |

OTHER PUBLICATIONS

R. J. Klein Wassink, "Soldering in Electronics", *Electrochemical Publications Limited*, 2nd Edition, Chapter 9.2, pp. 483–489, (1989).

*Primary Examiner*—Kenneth J. Ramsey
*Attorney, Agent, or Firm*—R. Hain Swope; Daid A. Draegert; Larry R. Cassett

[57] ABSTRACT

A wave soldering process and apparatus in which a localized low oxygen-containing atmosphere is provided at the point of contact of the solder wave and the substrate to be soldered by bubbling an inert gas through the solder wave.

29 Claims, 7 Drawing Sheets

WAVE SOLDERING APPARATUS AND PROCESS

TECHNICAL FIELD

The present invention is generally directed to a wave soldering process in which a substrate, such as a printed circuit board, is contacted with a solder wave in a low oxygen-containing atmosphere which is formed by passing an inert gas through the solder wave in a manner which at least substantially does not splatter solder against the substrate.

BACKGROUND OF THE PRIOR ART

Wave soldering in a low oxygen-containing atmosphere has demonstrated improved results over wave soldering in air or other high oxygen content atmospheres.

The presence of appreciable quantities of inert gas such as nitrogen gas improves solderability and reduces dross. More specifically, nitrogen gas improves the ability of solder to penetrate the clearance or joint between the component to be soldered to a substrate and the substrate itself (i.e. improved wicking or capillary action). To obtain maximum benefit from the introduction of nitrogen gas, it is important that the nitrogen gas be available at or near the apex of the solder wave where contact is made between the substrate and the solder.

The wicking action of the solder can also be improved if the solder wave undergoes some vibrational movement during the soldering operation. A slight vibrational motion is desired to avoid the presence of trapped gases in the joint. On the other hand, excessive vibrational movement will cause splattering of the solder onto the substrate resulting in poor solder connections and possibly defective products.

It is desirable to insure that the substrate to be soldered is as free of oxides as possible. In this regard it is helpful if the atmosphere in which the substrate is pretreated (e.g. preheated) and soldered be controlled so as to avoid the presence of excessive amounts of oxygen.

It is also desirable to prevent the formation of dross which results from the oxidation of the molten metal. Accordingly, it has been proposed to enclose the entire soldering operation from all or a portion of the preheating stage to the actual soldering stage in a hood as disclosed in U.S. patent application Ser. No. 08/067,764 filed May 26, 1993.

The three principal areas of dross formation in proximity to the solder wave are at the top or apex of the solder wave, where the wave descends from the apex, and near the walls of the solder pot.

There have been efforts to conduct wave soldering in a protective atmosphere which is generally defined as having an oxygen content of less than 10% by volume. Reducing the amount of oxygen in vicinity of the soldering operation results in less dross. Traditionally, the protective atmosphere is created by enclosing the wave soldering area in a protective hood and then filling the space beneath the protective hood with an inert gas, such as nitrogen gas.

The cost of supplying nitrogen gas on a continuous basis to the entire space beneath the soldering hood significantly increases the cost of wave soldering. Recently, there has been an attempt to provide a localized blanket of inert gas at the junction of the substrate to be soldered and the solder wave so as to minimize the amount of nitrogen gas which is used to generate a viable protective atmosphere. John H. Gileta et al., U.S. Pat. No. 5,203,489, disclose a cover or shroud which at least partially covers the solder reservoir. Above the surface of the solder in the solder reservoir and to the side of the solder wave, there is positioned at least one nozzle for injecting an inert gas. The shroud forces the injected nitrogen gas to flow along the surface of the solder wave up to the point of contact of the solder wave and the substrate to be soldered.

While such systems may be effective in minimizing dross where the solder wave descends, optimal protection against dross is not obtained at the apex of the wave and near the walls of the solder pot.

It would be desirable to provide a method and apparatus for generating a localized low oxygen-containing atmosphere in which the atmosphere is controlled and the amount of inert gas employed minimized. In addition, it would be desirable to provide a wave soldering process in which dross in all principal areas of dross formation, including those in proximity to the solder wave is effectively reduced.

SUMMARY OF THE INVENTION

The present invention in its broadest aspects is directed to a process and apparatus for the formation of a localized low oxygen-containing atmosphere at the point at which a substrate, such as a printed circuit board, contacts a solder wave. An inert gas is transported through the solder to form the localized atmosphere. The process and apparatus of the present invention minimize the development of dross in all principal locations of dross formation in proximity of the solder wave and thereby effectively maximize the efficiency of application of the inert gas.

In a preferred aspect of the invention the generation of the localized low oxygen-containing atmosphere is performed in an overall wave soldering process including one or more substrate pretreatment stages. More specifically, the substrate is fluxed in a low oxygen-containing atmosphere, the fluxed substrate is preheated at least partially in a non-low oxygen-containing atmosphere and the preheated substrate is contacted with a solder wave in a low oxygen-containing atmosphere obtained by passing the inert gas through the solder wave itself.

The process of the present invention therefore comprises:

(a) forming a least one solder wave;

(b) generating a flow of an effective amount of an inert gas through the solder wave to enable the formation of a low oxygen-containing atmosphere at least in the vicinity immediately above the solder wave without substantially splattering the solder onto a substrate to be soldered; and (c) passing the substrate into contact with the solder wave in said low oxygen-containing atmosphere.

The process and apparatus of the present invention provide a localized low oxygen-containing atmosphere at the point where soldering takes place and also provide greater control over the atmosphere in the vicinity of the solder wave. The efficiency of the wave soldering process is thereby maximized. In addition, the volume of oxygen is reduced to negligible amounts so that the production of dross is reduced in all principal areas of formation.

The present invention is premised on the discovery that a low oxygen-containing atmosphere can be provided in the vicinity of the solder wave by conveying an inert gas up through the solder wave itself. In a preferred form of the invention, the inert gas is generated in the form of discreet bubbles which flow upwardly through the solder wave and provide a blanket of inert gas to the area immediately above the level of the solder comprising the solder wave. The size and force of the bubbles are controlled to substantially eliminate splattering of the solder onto the substrate and to control the fitness and content of the low oxygen-containing atmosphere.

The substrate may optionally be pretreated by fluxing in a low oxygen-containing atmosphere and preheating and at least partially in a non-low oxygen-containing atmosphere, such as air.

BRIEF DESCRIPTION OF THE DRAWINGS

The following drawings in which like reference characters indicate like parts are illustrative of embodiments of the invention and are not intended to limit the invention as encompassed by the claims forming part of the application.

DETAILED DESCRIPTION OF THE INVENTION

The present invention is directed to a wave soldering process and apparatus in which at least one solder wave is formed and a localized low oxygen-containing atmosphere is provided above the solder wave. The low oxygen-containing atmosphere is provided at least in part by at least one injector within the solder wave which generates bubbles of an inert gas which pass through the solder wave to directly form the low oxygen-containing atmosphere. In a preferred form of the invention the substrate is pretreated by fluxing in a low oxygen-containing atmosphere and then preheated at least partially in a non-low oxygen-containing atmosphere.

The present invention is directed to the wave soldering of a substrate such as a printed circuit board. Referring to the drawings and first to FIG. 1 there is shown a wave soldering apparatus 2 which includes a solder pot 4 at least partially filled with solder to form a solder bath 6. A device 8 is provided for forming at least one solder wave 10 which contacts a substrate to be soldered (not shown) in a conventional manner. As shown in the drawings only one solder wave is shown. However, it should be understood that more than one solder wave may be employed and systems for producing multiple solder waves are well known to those of ordinary skill in the wave soldering art.

Figure 1:
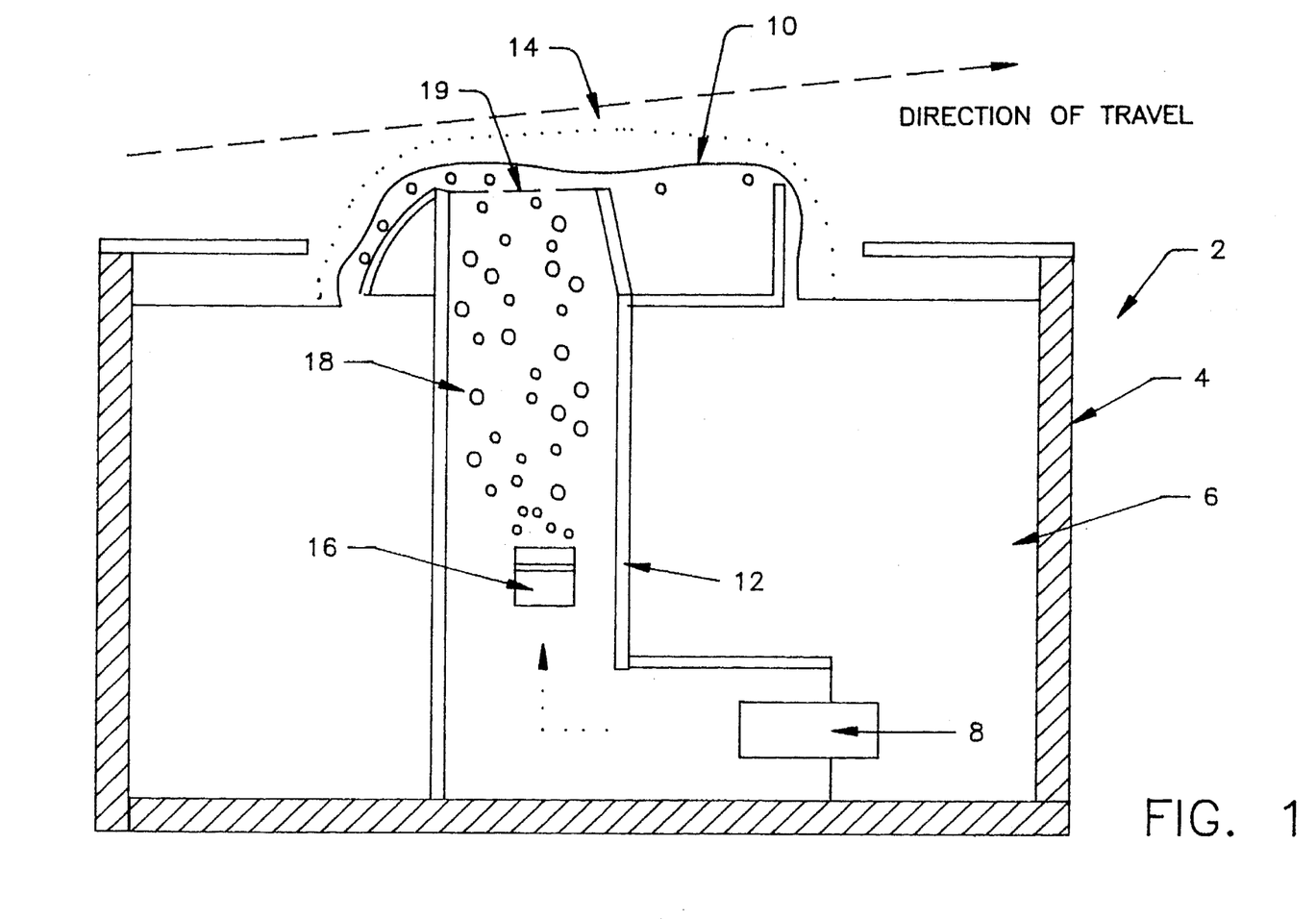
FIG. 1 is a front view in cross section of an embodiment of the present invention employing an injector for generating bubbles of an inert gas within the solder bath so as to form a localized low oxygen-containing atmosphere immediately above the solder wave.

The device 8 may be, for example, a conventional pump or vibrator, positioned within the solder bath 6. The pump 8 transmits pressure energy to the solder causing the solder within a channel 12 to lift and form the solder wave 10.

In accordance with the present invention, a thin layer or blanket 14 of a low oxygen-containing atmosphere is provided above the solder wave 10. As used herein, the term "low oxygen-containing atmosphere" shall mean an atmosphere which contains no more than about 10% by volume of oxygen, preferably less than 1% by volume of oxygen, especially less than 100 parts per million of oxygen. The most preferred embodiment of the invention is where the oxygen content immediately above the surface of the solder wave 10 is in the range of less than 10 parts per million of oxygen.

The thin layer or blanket 14 of the low oxygen-containing atmosphere is provided by transporting an inert gas from a source (not shown) to an injector 16 within the solder wave. The injector 16 generates bubbles 18 of the inert gas which rise within the solder bath 6 until they break the surface of the solder wave 10. As the bubbles 18 escape from the surface of the solder wave 10 they form a thin blanket 14 of the low oxygen-containing atmosphere.

The inert gas employed in the present invention may be selected from nitrogen, helium, argon, carbon dioxide, mixtures thereof and the like. Optionally the inert gas may include small amounts (typically less than about 4% by volume) of a reactive gas (e.g. hydrogen gas). While any inert gas may be used in the present invention, it is preferred to use nitrogen gas.

The bubbles 18 of the inert gas are controlled so as to form the low oxygen-containing atmosphere 14 without generating such turbulence at the surface of the solder wave 10 that appreciable splattering of the solder takes place.

If the bubbles are too large and/or if the force of the bubbles breaking the surface of the solder wave (i.e. breaking force) is too great splattering of the solder against the substrate can occur. For example, Katsuhiko Tsuchikura, U.S. Pat. No. 4,375,271, incorporated herein by reference, shows the positioning of an injector at the bottom of the solder pot remote from the surface of the solder wave. The bubbles of gas formed by this injection device are large and possess sufficient force so as to purposely splatter solder against the substrate. The bubbles generated in the '271 patent originate from a nozzle unit positioned at a distance remote from the substrate. By the time the bubbles reach the surface of the solder wave, their size and force are sufficient to create splattering of the solder which is not desirable in the present invention.

The force under which the bubbles leave the surface of the solder wave is dependent principally on the distance the bubbles travel from the injector to the surface. Generally, the explosive force of the bubbles as they break the surface of the solder wave will increase as the distance from the injector to the surface increases. As the bubbles rise to the surface, the pressure of the solder on the bubbles decreases enabling the bubbles to expand. The longer the distance of travel, the greater the time available for the bubbles to expand. In accordance with the present invention, the force exerted by the bubbles at the surface of the solder wave is not sufficient to cause appreciable splattering of solder against the substrate.

Bubbles will also increase in size if the gas within the bubbles is heated and therefore expands. To avoid or limit an increase in bubble size in this manner, the gas employed to form the bubbles may be preheated prior to injection through the injector 16. Preheating of the inert gas may be accomplished in a customary manner by passing the inert gas from the source through a preheating device (not shown) prior to its passage into the injector 16. The preheating device can be a tube containing a conventional heating coil.

To insure that splatter is eliminated or at least minimized, the solder pot 2 may be fitted with an optional wire mesh screen 19 positioned so as not to interfere with the substrate but sufficiently close to the surface of the solder wave so as to reduce the velocity and/or the force of the rising bubbles when they break through the surface of the solder.

Thus, the injector 16 as shown in FIG. 1 is positioned close enough to the surface of the solder wave so as to generate bubbles of inert gas which do not develop sufficient force upon breaking the surface to substantially splatter solder.

Figure 2:
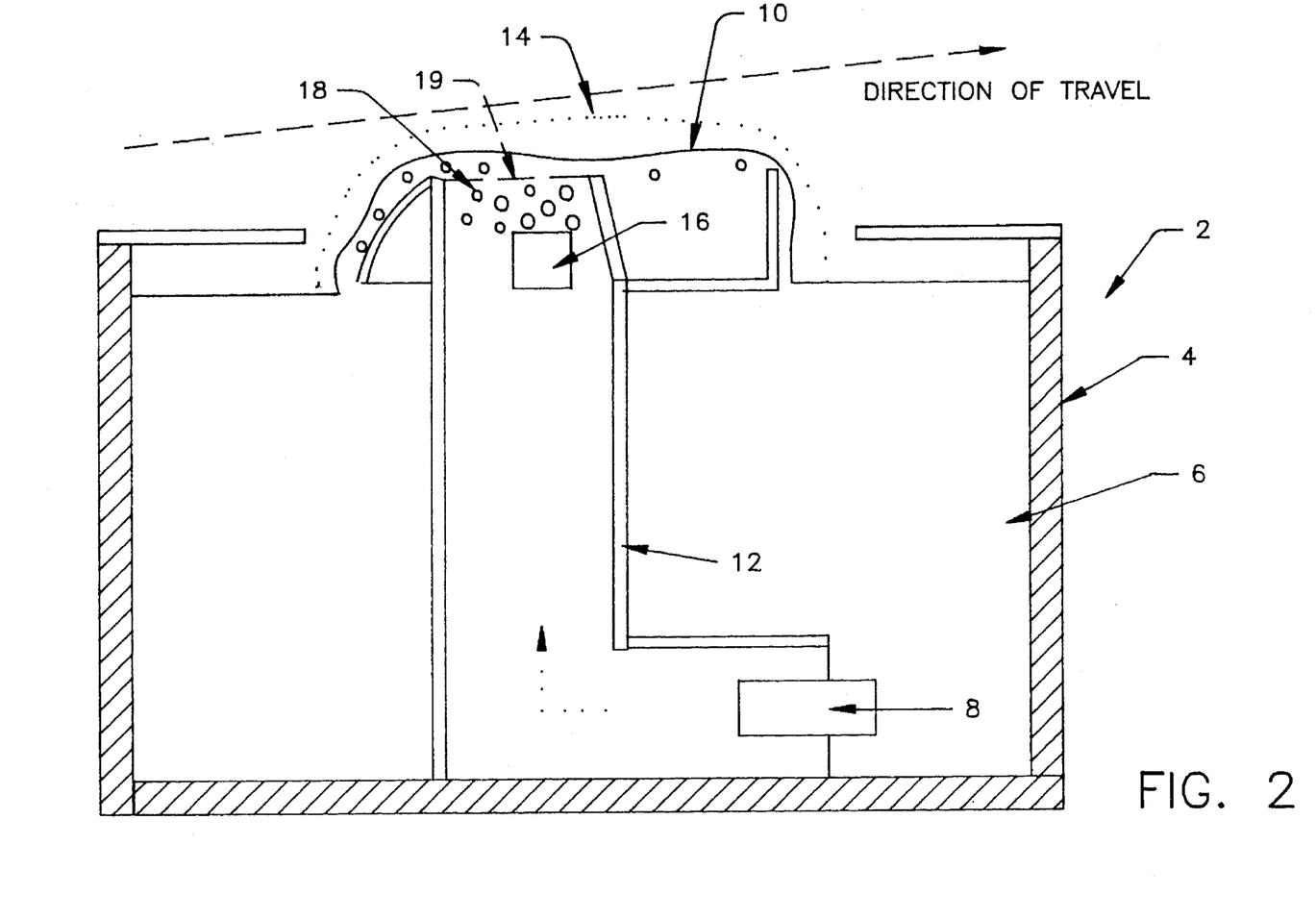
FIG. 2 is an embodiment of the invention similar to FIG. 1 showing the injector for creating the bubbles of inert gas in close proximity to the surface of the solder wave.

The distance between the injector 16 and the surface of the solder wave 10 (i.e. the distance of travel of the inert gas bubbles) in accordance with the present invention will vary depending on the depth of the solder bath. Generally, it is desirable to position the injector 16 at least one half of the distance between the base of the solder pot 4 and the surface of the solder wave 10, most preferably just below the surface of the solder wave 10. In a preferred form of the invention as shown in FIG. 2, the injector 16 is positioned near the surface of the solder wave 10. As a result, the bubbles 18 of inert gas have a relatively short distance to travel to the surface of the solder wave 10 and therefore will generally be less explosive when they break the surface of the solder wave 10.

The position of the injector 16 therefore provides control over the force of the bubbles 18 of inert gas as they break the surface of the solder wave 10. The injector 16 may be positioned anywhere within the channel 12 so long at it is submerged within the solder bath 6 when the solder apparatus is in operation. The closer the injector 16 is to the surface of the solder wave 10 as shown in FIG. 2, the less explosive force will be available to the bubbles.

Figure 3:
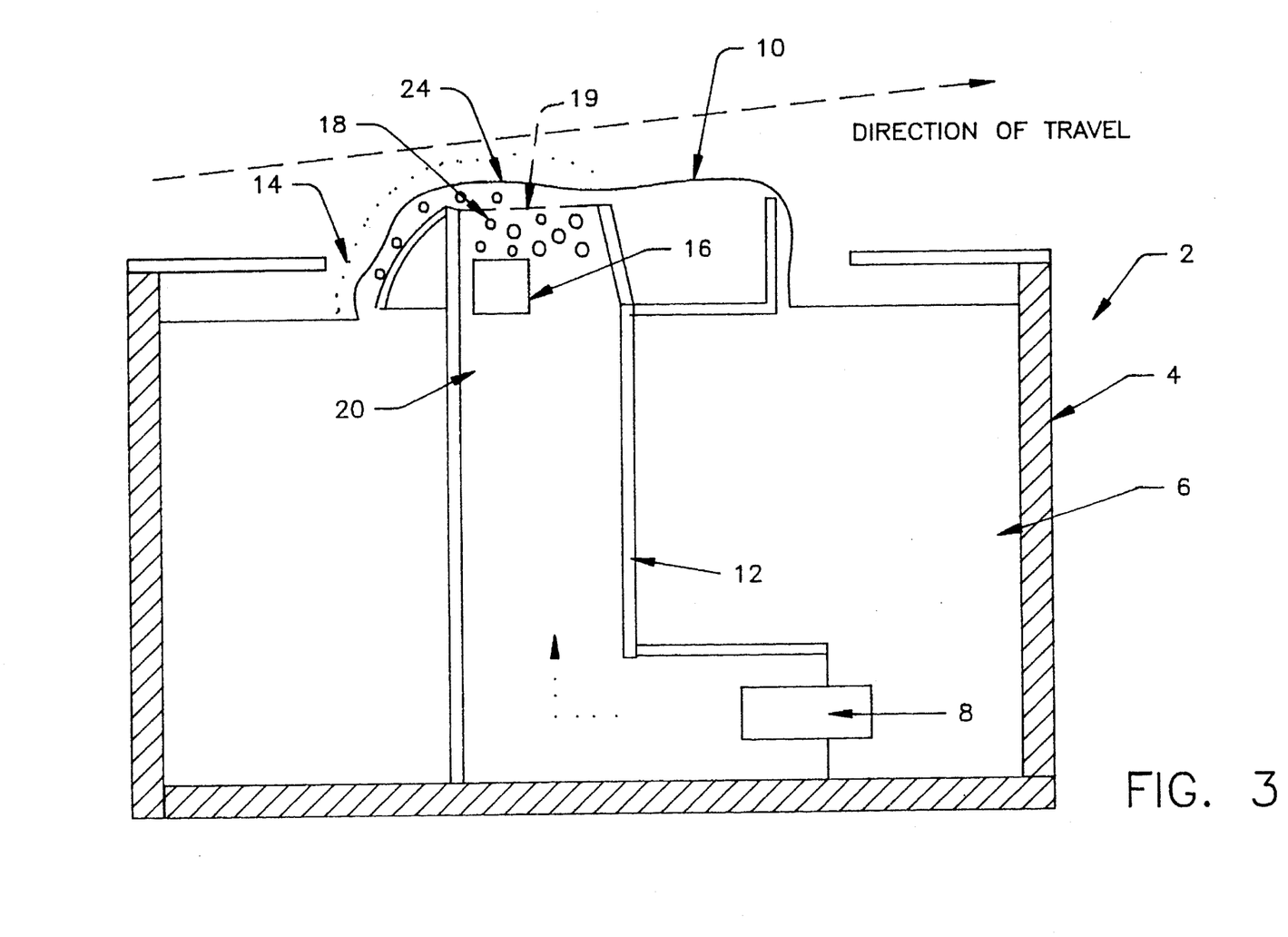
FIG. 3 is an embodiment of the invention similar to FIG. 1 in which the injector is positioned toward the front of the solder wave.

In another embodiment of the invention, the injector 16 may be moved toward the forward end of the solder wave to concentrate the inert gas at the point of contact of the substrate. In this embodiment a greater amount of the inert gas, after breaking the surface of the solder wave 10, will flow upwards along the solder wave to the point of contact of the substrate at the apex of the solder wave. Referring to FIG. 3, the injector 16 is moved toward the forward side 20 of the channel 12. Accordingly, more inert gas is provided to the forward side 20 the solder wave 10. The inert gas in this location will move toward the apex 24 of the solder wave when contact with the substrate will generally be made.

As previously indicated, the soldering operation may employ multiple solder waves. In this event, it is preferred to provide bubbles of inert gas through each of the solder waves and particularly preferred to transmit a greater volume of the inert gas through the forward solder wave (i.e. the first solder wave to contact the substrate) than the rearward solder wave(s). The greater volume of inert gas in the forward solder wave is employed to remove any gas that may be trapped in the substrate to make the application of the solder more uniform as the substrate proceeds through the soldering operation.

Figure 4:
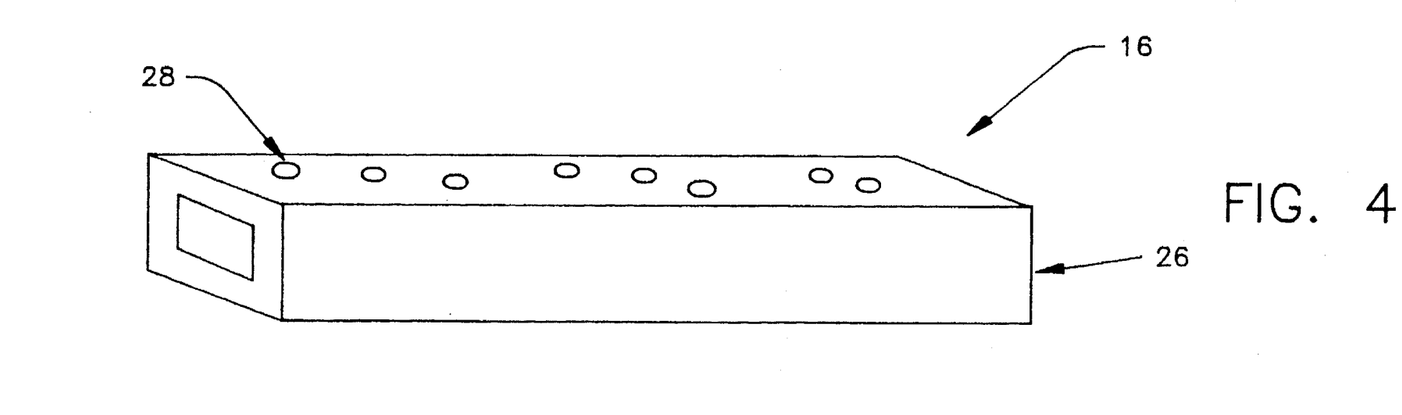
FIG. 4 is a side view of a porous tube which may be used as an injector in the present invention for generating bubbles of inert gas within the solder bath for forming the localized low oxygen-containing atmosphere.
Figure 5:
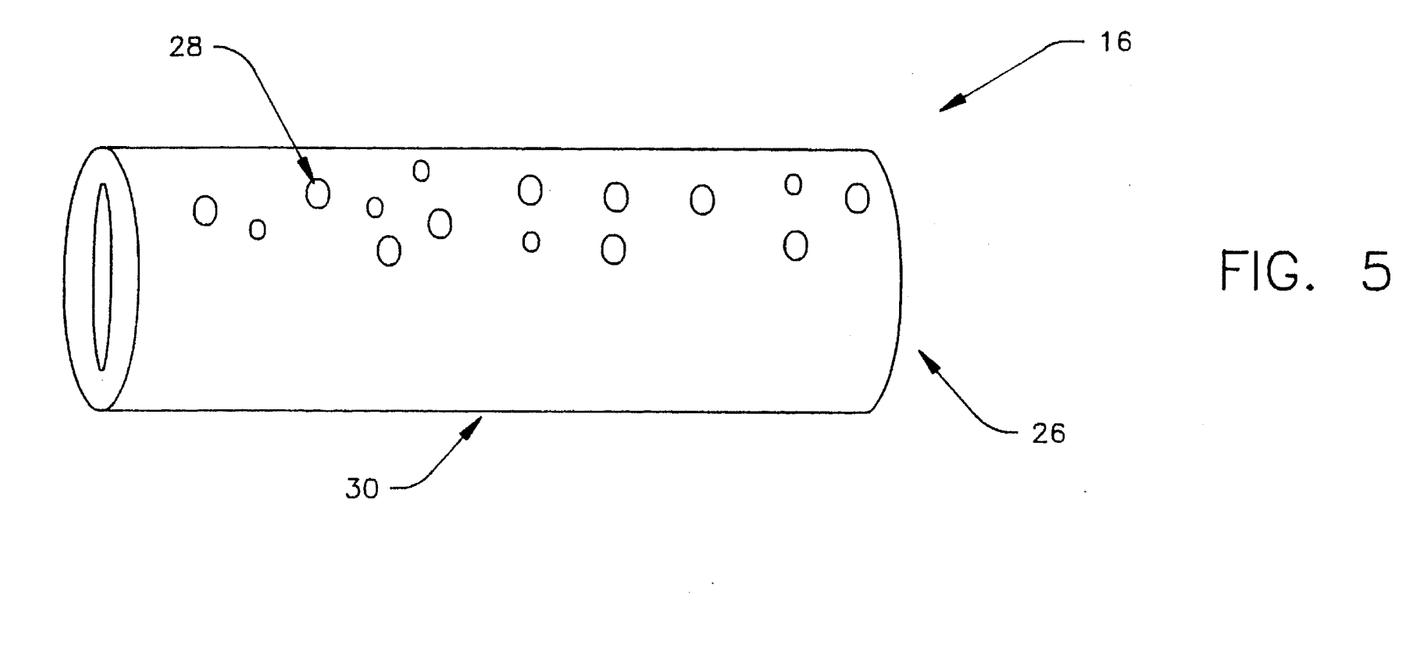
FIG. 5 is a side view of another embodiment of the porous tube having a rear surface particularly suited for allowing the solder to pass smoothly around the porous tube as it flows upwardly in the solder pot.

The injector 16 can be any device capable of receiving an inert gas from a source and generating bubbles of the gas within the solder wave. Referring to FIGS. 4 and 5, there is shown two exemplary embodiments of an injector 16 each comprised of a porous conduit 26, having a plurality of openings 28 at the upper surface thereof adapted for use in generating bubbles within a solder wave. The openings 28 are of sufficient size (i.e. the tube having sufficient porosity) so that an inert gas such as nitrogen gas can pass therethrough and form bubbles. The openings 28 may be of the same size or may vary in size depending on the distance the injector 16 is placed from the surface of the solder wave 10.

The spacing of the openings 28 in the conduit 26 can also vary. It is desirable, however, to have a sufficient number of spaced apart openings so that a sufficient amount of the inert gas may be released to form the desired low oxygen-containing atmosphere in accordance with the present invention.

FIG. 5 shows an embodiment of the porous conduit 26 described above in connection with FIG. 4 which is provided with a curvilinear base 30 (the conduit 26 being in the form of a tube) positioned against the direction of the flow of solder. This embodiment of the injector 16 is particularly adapted to reduce friction from the solder as it passes along the base 30 upwards towards the solder wave 10. The curvilinear base 30 reduces drag of the solder and therefore is a preferred construction for the porous conduit 26.

Figure 6:
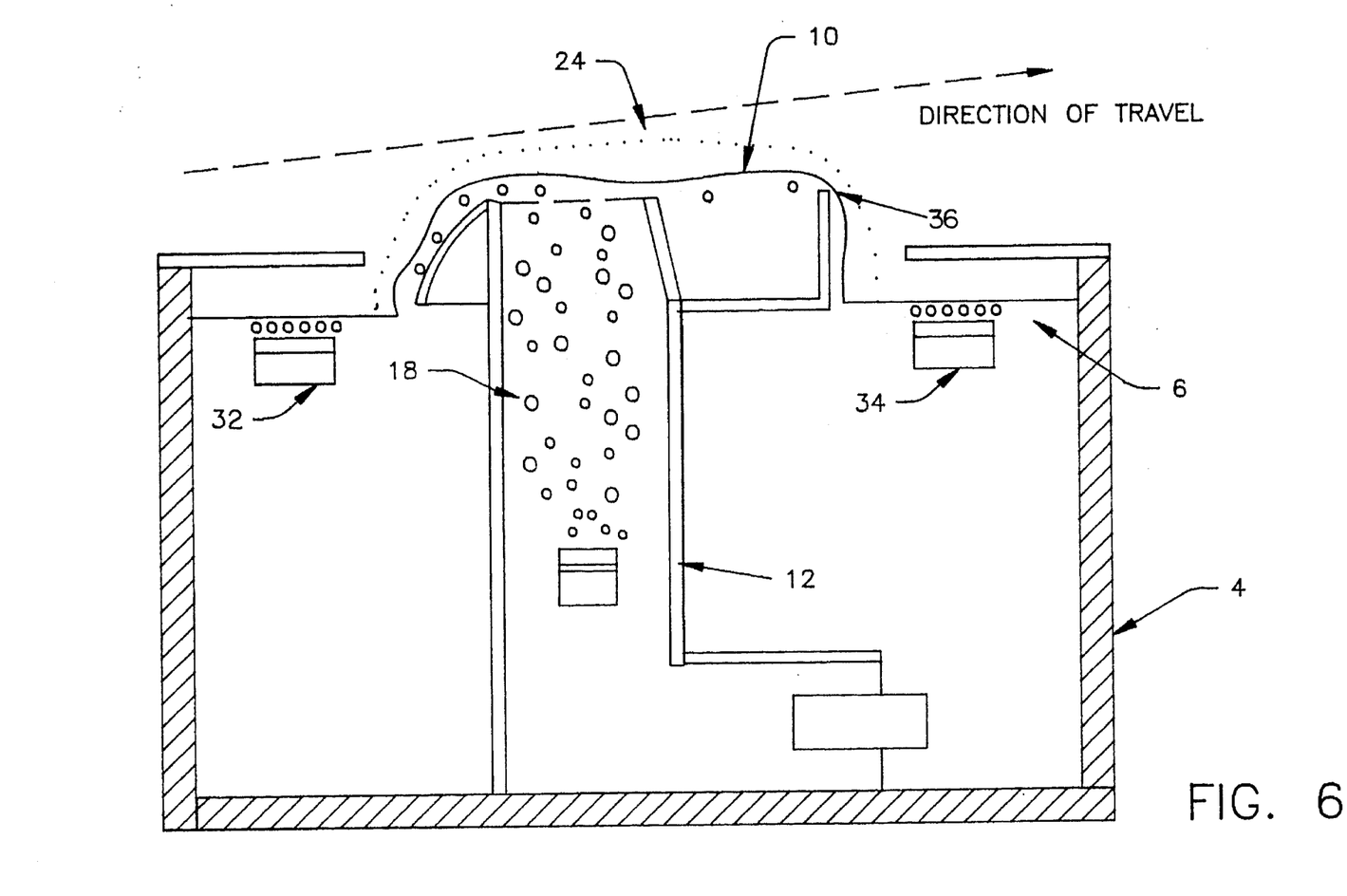
FIG. 6 is a side view in cross-section of a soldering apparatus similar to FIG. 1 showing additional injectors within the solder bath for providing the localized low oxygen-containing atmosphere above the solder wave/bath.

The present invention also encompasses the use of more than one injector submerged within the solder bath. The additional injectors may be positioned at strategic points within the solder bath either within or outside of the channel 12 to supplement the flow of inert gas to form the localized low oxygen-containing atmosphere. Referring to FIG. 6, there is shown one such embodiment employing two additional injectors 32 and 34, respectively. The injector 32 is positioned just below the level of the surface of the solder bath 6 and outside of the channel 12 in a manner such that the released inert gas will flow along the surface of the solder wave 10 to the apex 24 where contact is made with the substrate.

The injector 34 is positioned in a manner such that the inert gas will flow up the rear side 36 of the solder wave 10 to assist in providing the localized low oxygen-containing atmosphere at the point where the solder wave 10 disengages from the substrate just rearward of the apex 24. In this embodiment, additional protection against dross formation both at the point of contact of the solder wave and the substrate and the point of release of the solder wave and substrate is provided.

Figure 7:
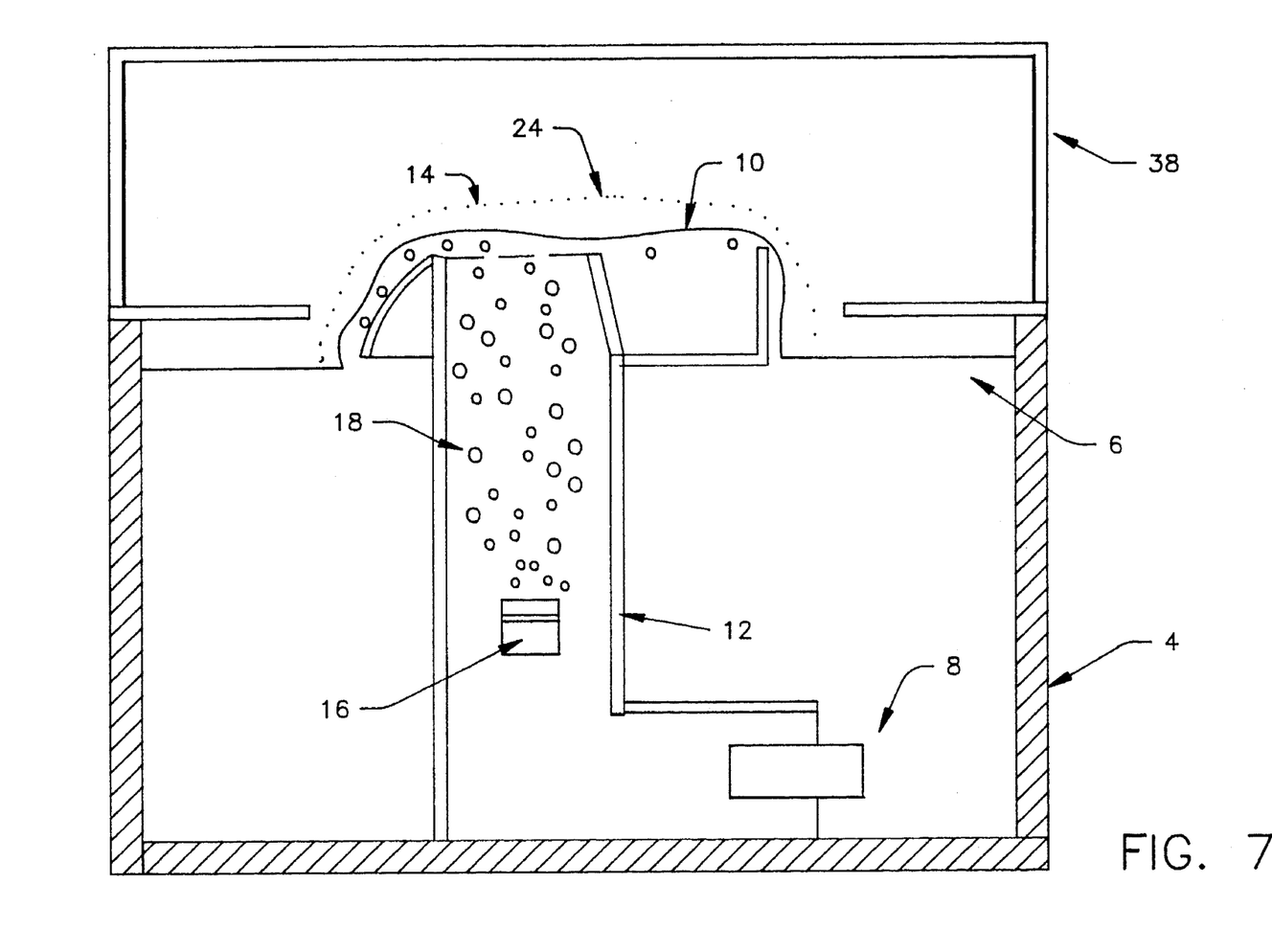
FIG. 7 is an embodiment of the invention similar to FIG. 1 showing a solder hood as a supplementary means of forming the localized low oxygen-containing atmosphere above the solder wave.

The present invention makes it possible to provide a localized low oxygen-containing atmosphere without the use of a hood. However, it should be appreciated that the present invention can be employed in the retrofitting of existing wave soldering devices which have a hood assembly. Referring to FIG. 7, a hood 38 is provided above the solder wave in a customary manner. The position of the injector 16 and its function, in accordance with the present invention, remains the same. The addition of the hood 38, while increasing the overall cost of the wave soldering apparatus and process, nonetheless, does serve to minimize the presence of oxygen at the point of contact of the solder wave and substrate. As previously indicated, the present invention is applicable to retrofit existing wave soldering devices having a hood above the solder pot. The hood assembly is typically provided with additional injectors (see FIG. 8) to inject an inert gas into the region above the solder wave in a customary manner.

The solder wave process and apparatus of the present invention also encompasses the pretreatment of the substrate in advance of the soldering operation. Specifically, the substrate may be fluxed and preheated prior to contact with the solder wave. In a preferred form of the invention, the fluxing and preheating operations conducted in accordance with U.S. patent application Ser. No. 08/067,764 filed May 26, 1993, incorporated herein by reference, are applied to the substrate prior to entry into the soldering operation. One embodiment of this aspect of the invention is shown in FIG. 8 herein.

Figure 8:
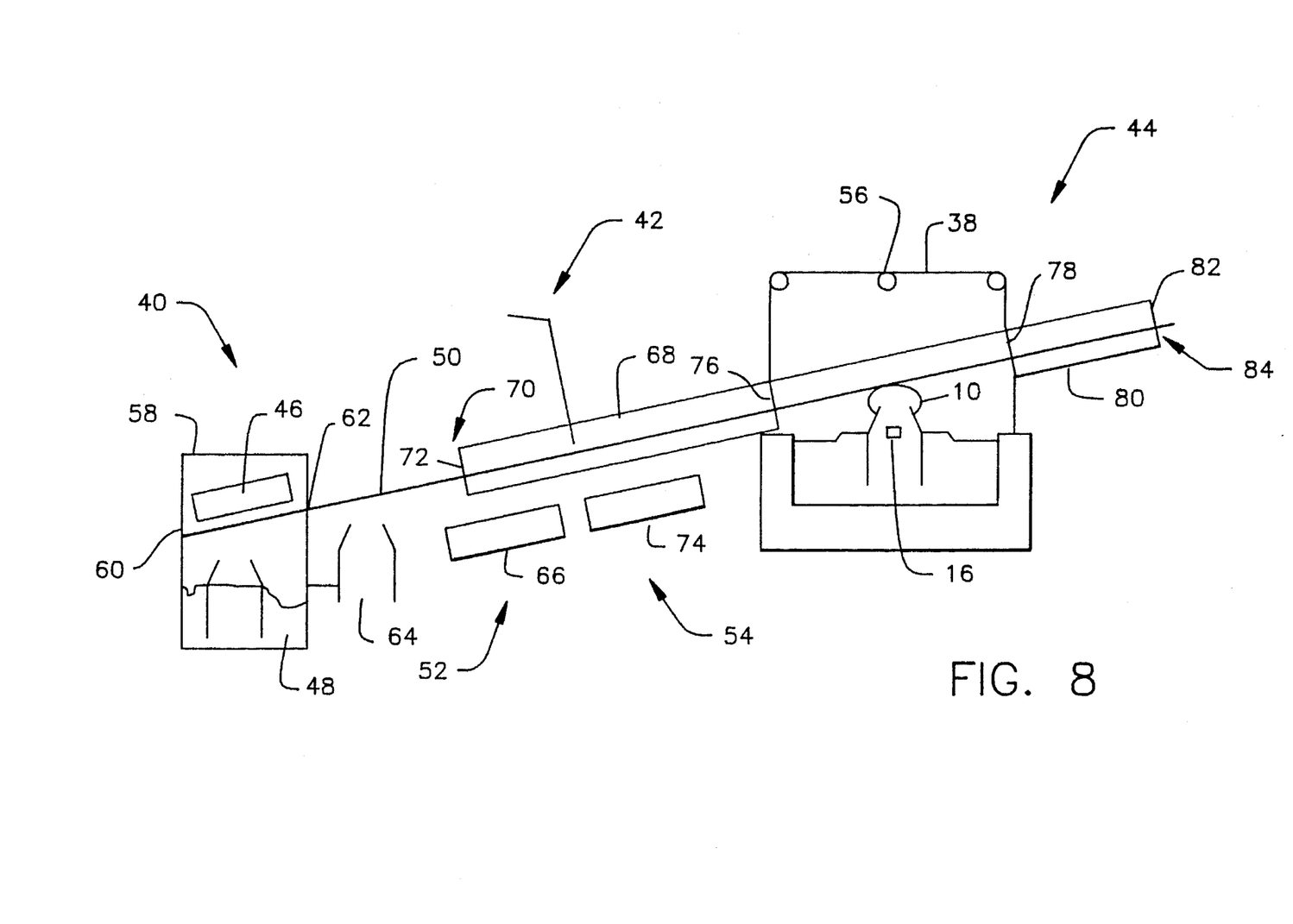
FIG. 8 is a schematic view of a preferred embodiment of the wave soldering operation in accordance with the present invention show pretreatment of the substrate followed by the formation of the localized low oxygen-containing atmosphere above the solder wave.

Referring to FIG. 8, there is shown an embodiment of the invention wherein fluxing is conducted in a low oxygen-containing atmosphere, and preheating is conducted at least partially in a non-low oxygen-containing atmosphere, such as air. Thereafter, the preheated substrate is contacted with the solder wave as described in connection with the embodiments of FIGS. 1–7 described herein.

More specifically, the wave soldering system includes a fluxing stage 40, a preheating stage 42 and a soldering stage 44. A substrate 46, such as a printed circuit board, is introduced into the fluxing stage 40 where a flux 48 is applied to the underside of the printed circuit board 46 to improve wetability and solderability. Fluxing may be carried out in a known manner such as by spraying or by foaming. A no-clean flux, such as one containing a mixture of rosin (abietic acid), dimethylamine hydrochloride and an alcohol, may be used. Low-residue no-clean fluxes such as those containing dilute solutions of one or more weak organic acids including adipic, succinic and malic acids in alcohol or water may also be used.

Spray fluxing typically involves a drum rotating in a liquid flux. Air is blown into the drum to generate a spray of flux in the direction of the printed circuit board. Foam fluxing is conducted by forcing low-pressure air through the pores of an aerator immersed in the flux. The resulting fine bubbles are passed to the surface of the boards by a nozzle. A more detailed explanation of these and other types of fluxing is disclosed in R. J. Klein Wassink "Soldering in Electronics", 2nd Edition, Chapter 9.2, pp. 483–489 (1989), incorporated herein by reference.

The fluxed board is then transferred along a conveyor belt 50 to the preheating stage 42 having a first section 52 for initiating preheating in a non-low oxygen containing atmosphere and a second section 54 for completing preheating in a low oxygen containing atmosphere. The preheated circuit boards 46 are then passed along the same conveyor belt 50 to the soldering stage 44 where contact is made with the solder wave 10 in the manner described above in conjunction with FIGS. 1–7 herein. As shown in FIG. 8, the soldering operation includes an injector 16 positioned below the solder wave 10 and an optional hood 38 with a plurality of injectors 56 for providing additional inert gas for the localized low oxygen-containing atmosphere.

The fluxing stage 40 is conducted in a low oxygen containing atmosphere which may be provided, as shown in FIG. 8, in an enclosed environment such as within a hood 58. The hood 58 includes an entrance 60 and an exit 62 for transporting the circuit board 46 into and out of contact with the flux 48.

Once the flux 48 has been applied to the circuit board 46, excess flux is then removed. This may be accomplished in a number of ways, typically by use of a customary air-knife 64. The fluxed circuit board 46 is then sent to the preheating stage 42.

In accordance with the present embodiment of the invention, preheating is conducted in two sections, a first section 52 where preheating is initiated in a non-low oxygen containing atmosphere (e.g. air), and a second section 54 which is provided with a low oxygen containing atmosphere.

The preheating stage 42 is provided with a first heater 66 in the first preheating section 52. The first preheater 66 emits heat in the range of about 460° C. to about 485° C. The heat is directly absorbed by the circuit board 46 (i.e. radiant heating) until the circuit board 46 reaches a temperature of from about 65° C. to about 125° C. Heating of the circuit board 46 may be conducted in the first preheating section 52 entirely in air, partially in air and partially in a low oxygen containing atmosphere.

This atmosphere is present within an extension 68 of the solder hood 38. The extension 68 is provided with a sufficient amount of a non-oxygen containing gas (e.g. nitrogen gas) so that the environment within the extension 68 is a low oxygen containing atmosphere. The extension 68 has an entrance 70 shielded by a curtain 72. The curtain provides a partial physical barrier to the flow of air into the second preheating section 54. The curtain 72 may be in the form of strips of cloth, rubber, or suitable plastic such as polyethylene.

At least one (three are shown) gas injectors 56 are positioned within the solder hood 38. An inert gas (i.e. nitrogen gas) is delivered from the injectors 56 in an amount sufficient to fill the solder hood 38 and diffuse into the extension 68.

The initially preheated circuit board 46 then passes into the second preheating section 54 of the preheating stage 42. Preheating is accomplished in this section by a second preheater 74 which operates at the same temperature (460° C.–485° C.) as the first preheater 66 and raises the temperature of the circuit boards 46 to about 200° C. The second preheating section 54 operates entirely in a low oxygen containing atmosphere within the extension 68. The preheating of the circuit board 46 is therefore provided under conditions which minimize the cost of the preheating operation while substantially eliminating the problems associated with preheating entirely in a non-low oxygen containing atmosphere such as air.

The preheated circuit boards 46 then enter the soldering stage through an entrance 76 and are soldered as described previously. After completion of soldering the circuit boards 46 are discharged through an exit 78. At this stage of the wave soldering operation, the circuit boards 46 begin to cool within a second extension 80 of the solder hood 38. A curtain 82, similar to the curtain 72, is provided at the exit 84 of the second extension 80. The second extension 80, therefore, provides a low oxygen containing atmosphere by the inert gas injected into the enclosed space formed by the solder hood 38.

EXAMPLE 1

Employing a wave soldering assembly of the type shown generally in FIG. 3, a porous tube of the type shown in FIG. 4 or 5, having a diameter of ⅜ inch and a plurality of spaced apart openings of a porosity of 10 microns was placed about ⅜ inch beneath the surface of the solder wave, about 3/16 inch from the corresponding side of the channel, and ⅜ inch from the opposite side of the channel. A screen having about 1/16 mesh holes was secured between about ⅛ inch and ¼ inch below the solder wave.

Nitrogen gas at the rate of 50 cubic feet/hour, obtained from a source of liquid nitrogen, was passed through the porous tube to produce a low oxygen-containing atmosphere immediately above the solder wave 10. Printed circuit boards were passed over the solder wave. The solder connections were found to be excellent and no more than minimum dross was found in the principal areas of dross formation.

What is claimed:

1. A wave soldering process comprising:
   (a) forming at least one solder wave;
   (b) generating a flow of an effective amount of an inert gas through the solder wave to enable the formation of a low oxygen-containing atmosphere at least in the region immediately above the solder wave without substantially splattering the solder onto a substrate to be soldered; and
   (c) passing the substrate to be soldered into contact with the solder wave within said low oxygen-containing atmosphere.

2. The process of claim 1 wherein the low oxygen-containing atmosphere contains less than 10% by volume of oxygen.

3. The process of claim 1 wherein the low oxygen-containing atmosphere contains less than 1% by volume of oxygen.

4. The process of claim 1 wherein the low oxygen-containing atmosphere contains less than 10 ppm of oxygen.

5. The process of claim 1 wherein the step of generating the flow of the inert gas comprises bubbling the inert gas through the solder wave.

6. The process of claim 5 comprising generating a flow of the inert gas from a source through at least one first injection means submerged within the solder used to form the solder wave when the solder wave is operatively contacting the substrate to be soldered.

7. The process of claim 6 further comprising preheating the inert gas and generating a flow of the preheated inert gas from the first injection means.

8. The process of claim 6 wherein the solder wave is generated within a channel extending from the bottom of a solder pot containing the solder, said process comprising generating the flow of the inert gas through the first injection means positioned within the channel closer to the solder wave than the bottom of the solder pot.

9. The process of claim 8 wherein the first injection means is positioned just below the surface of the solder wave.

10. The process of claim 8 further comprising offsetting the position of the first injection means toward a side of the channel.

11. The process of claim 10 comprising offsetting the position of the first injection means toward the side of the channel in proximity to a front side of the solder wave.

12. The process of claim 8 further comprising generating a flow of inert gas from a second injection means.

13. The process of claim 12 further comprising preheating the inert gas and generating a flow of the preheated inert gas from the second injection means.

14. The process of claim 12 wherein the second injection means is below the surface of the solder in the solder pot and outside the channel.

15. The process of claim 14 wherein the second injection means comprises a plurality of injectors for generating a flow of inert gas from a plurality of locations within the solder pot.

16. The process of claim 6 wherein the first injection means comprises a porous tube having multiple openings, said process comprising passing the inert gas through the porous tube and out of the openings toward the solder wave.

17. The process of claim 6 further comprising conducting the solder process under a hood and supplying an inert gas to a space between the hood and the solder wave.

18. The process of claim 6 further comprising fluxing the substrate in a low oxygen containing atmosphere, and preheating the fluxed substrate at least partially in a non-low oxygen-containing atmosphere.

19. The process of claim 18 comprising preheating the fluxed substrate in a non-low oxygen containing atmosphere.

20. The process of claim 18 comprising preheating the fluxed substrate in two stages, a first stage in which the fluxed substrate is preheated in a non-low oxygen-containing atmosphere, and a second stage immediately following the first stage in which the fluxed substrate is preheated in a low oxygen-containing atmosphere.

21. The process of claim 20 wherein the first stage of the preheating step is carried out in air.

22. The process of claim 18 wherein the step of preheating the fluxed substrate is conducted partially in a low oxygen-containing atmosphere, said process comprising allowing an inert gas to diffuse into the preheating step.

23. The process of claim 18 wherein the step of preheating the fluxed substrate is conducted partially in a low oxygen-containing atmosphere, said process comprising injecting an inert gas directly into the fluxing step.

24. The process of claim 5 comprising positioning a screen between the bubbles formed by the inert gas and the substrate to reduce the velocity or the breaking force of the bubbles.

25. The process of claim 1 wherein the inert gas is selected from the group consisting of nitrogen, helium, argon, carbon dioxide and mixtures thereof.

26. A wave soldering apparatus comprising:
   (a) means for forming at least one solder wave;
   (b) at least one injection means for generating a flow of inert gas through the solder wave to enable the formation of a low oxygen-containing atmosphere in the region immediately above the solder wave without substantially splattering the solder onto a substrate to be soldered; and
   (c) means for processing the substrate to be soldered into contact with the solder wave within said low oxygen-containing atmosphere.

27. The wave soldering apparatus of claim 26 further comprising means for heating the inert gas prior to the generation of the flow of the inert gas from the injection means.

28. The wave soldering apparatus of claim 26 wherein the solder wave is formed within a channel extending from the bottom of a solder pot containing the solder, at least one of said injection means being positioned within the channel closer to the solder wave than the bottom of the solder pot.

29. The wave soldering apparatus of claim 26 further comprising a screen positioned between the injection means and the substrate to reduce the velocity or the breaking force of the inert gas from the injection means.

* * * * *